United States Patent

[11] 3,537,644

| [72] | Inventor | Bartholomew J. Davison |
| | | Simsbury, Connecticut |
| [21] | Appl. No. | 751,784 |
| [22] | Filed | Aug. 12, 1968 |
| [45] | Patented | Nov. 3, 1970 |
| [73] | Assignee | United Aircraft Corporation |
| | | East Hartford, Connecticut |
| | | a corporation of Delaware |

[54] COMBINED PRESSURE AND TEMPERATURE REGULATOR
5 Claims, 1 Drawing Fig.

[52] U.S. Cl. .................................................... 236/80,
                                                    165/15, 236/85
[51] Int. Cl. ............................................. G05d 23/12
[50] Field of Search .......................................... 165/15, 40,
                                    38; 236/80, 92, 85; 98/1.5

[56]                References Cited
              UNITED STATES PATENTS

| 2,562,918 | 8/1951 | Hynes | 165/15X |
| 2,858,075 | 10/1958 | Le May et al. | 236/80X |
| 3,155,317 | 11/1964 | Puster et al. | 236/80 |
| 3,307,786 | 3/1967 | Salerno | 336/80 |

Primary Examiner—William E. Wayner
Attorney—Norman Friedland

ABSTRACT: The temperature and pressure discharging from a heat exchanger is controlled by a single valve by utilizing a single controller responding to temperature and pressure including stop means to render the temperature sensor inoperative when the temperature is below a certain value and to render the pressure regulating means inoperative when the pressure is below a certain value and providing position feedback to assure stable operation so as to assure maximum flow during all conditions of operation.

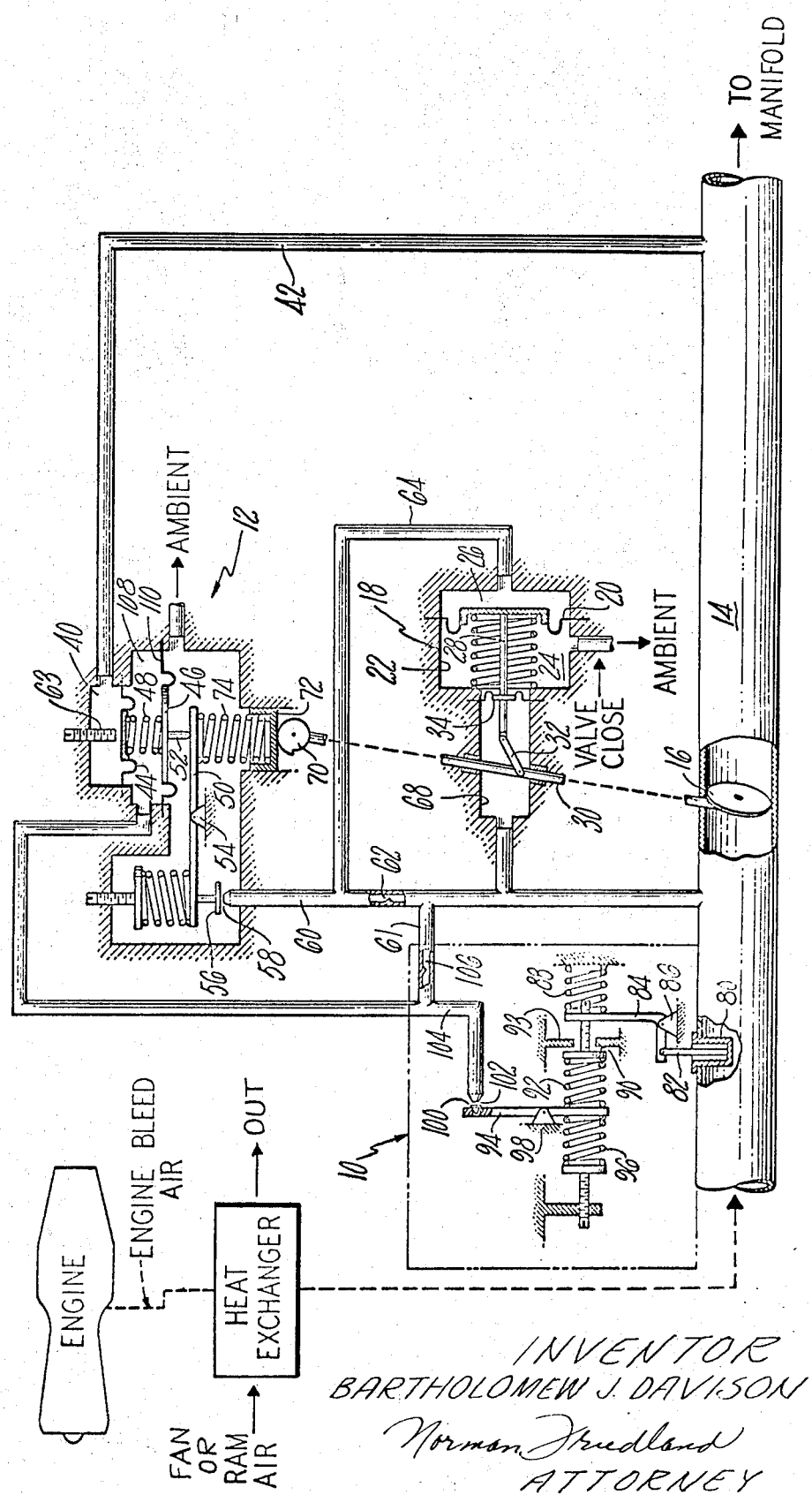

COMBINED PRESSURE AND TEMPERATURE REGULATOR

CROSS REFERENCES TO RELATED CASES

This invention relates to an application entitled Pressure and Temperature Regulator For Aircraft Bleed Air System, filed by C. Brahm, G. Rannenberg, and myself on even date and assigned to the same assignee.

BACKGROUND OF THE INVENTION

This invention relates to a combined pressure and temperature regulator utilizing position feedback to assure maximum flow and stability and incorporating stop means to render the temperature sensor and pressure sensor inoperative whenever the temperature and/or pressure goes below a predetermined value.

The cross-referenced application addresses itself to the problem of reducing heat exchanger size and assuring the temperature of the heat exchanger discharge air does not exceed a predetermined value. This application addresses itself to the problem of implementing such a system in a novel manner.

As would be obvious to one skilled in the art, the problem of controlling the pressure and temperature of the heat exchanger discharging air can be done in two ways. One method would be to employ separate valves, one responding to temperature and the other to pressure. Obviously, this system requires a redundancy of parts and not only would be expensive to implement but also adds considerably to the size, weight and complexity of the system, each factor being detrimental, particularly for aircraft operation.

Another method is to utilize a customary pressure regulator of the type that includes position feedback, and senses temperature directly to override it so as to close-off the flow whenever the temperature reaches a predetermined value, the temperature sensor in this instance would work directly on the valve actuator. Such a system, since it limits temperature by not utilizing position feedback would be unstable resulting in severe temperature and pressure fluctuations.

Hence, this invention obviates the problems noted in the two methods described above, and permits stable flow while providing pressure or temperature limiting. Thus, the invention permits the utilization of existing pressure regulating mechanism and adds thereto a temperature controller that limits temperature yet permitting the pressure regulating valve to deliver flow at a maximum capacity.

SUMMARY OF THE INVENTION

A primary object of this invention is to provide an improved pressure and temperature regulator.

In accordance with the present invention means utilizing a pressure regulator and a valve is utilized to limit temperature sensed in a common duct while assuming maximum flow during temperature limiting.

In accordance with a further aspect of the present invention fluid control means are provided to control the temperature of fluid being transmitted through a duct which means are insensitive to supply fluid pressure.

In accordance with a still further aspect of the present invention dynamic stability and good accuracy are obtained in a common controller responding to temperature and pressure by having position feedback and stop means for rendering the pressure sensor inoperative when the pressure goes below a predetermined value and for rendering the temperature sensor inoperative when the temperature goes below a predetermined value.

Other features and advantages will be apparent from the specification and claims and from the accompanying drawing which illustrates an embodiment of the invention.

The sole FIG. schematically illustrates a preferred embodiment of this invention wherein the temperature sensor is generally indicated by numeral 10 and the combined pressure and temperature controller is generally illustrated by numeral 12.

In the preferred embodiment duct 14 serves to transmit pressurized fluid bled off a turbine-type of powerplant which fluid is precooled by a heat exchange prior to being distributed to an air-conditioning system for cooling the cabin of the aircraft and/or other pneumatic drives.

Throttle valve 16 which may take the form of a suitable butterfly valve is disposed in duct 14 downstream of the heat exchanger and serves to regulate the pressure and temperature downstream thereof in accordance with the signal produced by controller 12 as will be described herewithin. Movement of valve 16 is controlled by actuator 18 which comprises diaphragm 20 dividing chamber 22 into two subchambers 24 and 26. Diaphragm 20 carries plunger 28 which in turn is suitably connected to shaft 30 by linkage 32. The linkage serves to rotate the shaft 30 which in turn is connected to the valve element of valve 16 for imparting rotary movement thereto. A second diaphragm 34 closes off the end of chamber 24 and is continually subjected to high pressure.

Looking for the moment at the pressure controller 12 which serves to control the pressure in duct 14 by varying the area of valve 16, pressure sensed downstream of valve 16 is admitted into chamber 40 via line 42 where it acts on the face of diaphragm 44. Force developed by diaphragm 44 is transmitted to platen 46 via spring 48 which in turn transmits a force to fulcrum lever 50 via the depending member 52. Fulcrum lever 50 pivots about the pivot 54 to control flapper valve 56 connected on the opposite end thereof. Flapper valve 56 moves relative to the orifice 58 located at the end of line 60 which serves to control the flow of fluid discharging therefrom for controlling the pressure drop across restriction 62. Obviously, this controls the pressure in lines 60 and 64 and the pressure in chamber 26.

From the foregoing it is apparent that flapper element 56 controls actuator 18 and hence valve 16 as a function of pressure in the duct 14. Obviously, when flapper element 56 abuts against orifice 58 no pressure drop will be evidenced across restriction 62 and the pressure in chamber 26 and hence pressure acting on face of diaphragm 20 will be the same as the pressure in chamber 68 acting on the face of diaphragm 34. Since diaphragm 20 is larger than diaphragm 34 the forces created thereby will cause the actuator to move leftwardly rotating valve 16 in the full open position.

Conversely, when the flapper element 56 is caused to move away from orifice 58 a pressure drop will be evidenced across fixed restriction 62 reducing pressure in chamber 26 allowing the actuator to move rightwardly to rotate valve element 16 toward the closed position.

An adjustable screw 63 is disposed in chamber 40 to abut against diaphragm 44 to limit the travel thereof. This screw is so positioned that when under normal pressure control, without excessive temperatures, the downstream pressure is free to fully open valve 16. This screw provides one of the elements of temperature override as described later so as to achieve temperature limiting accuracy.

Position feedback is effectuated by varying the height of spring 74 which abuts against fulcrum lever 50 and slidable spring retainer 72. As can be seen by the drawing, cam 70 suitably mounted for rotation is rotated by shaft 30. Hence, the position of valve 16 is transmitted via shaft 30, cam 70, spring retainer 72 and spring 74 to fulcrum lever 50 for restoring the flapper valve element to its original position to balance out the system.

The next portion of the description will describe the temperature sensor and controller. The temperature sensor and controller 10 transmits a pressure signal to the pressure and temperature controller 12 which is proportional to temperature in the duct 14. Temperature of the fluid in the duct line is sensed by the temperature sensor comprised of elements 80 and 82 which are composed of materials with different coefficients of thermal expansion. As temperature increases 80 expands more than 82 resulting in a counterclockwise motion of bellcrank 84 pivotally connected to pivot 86. Hence, a change in temperature rotates bellcrank 84 which has one end bearing against spring 88. This end carries adjustable spring retainer 90 which serves to position spring 92 against fulcrum lever 94. This spring is balanced by adjustable spring 96 and serves to impart a balancing force on fulcrum lever 94 which pivots about pivot member 98. This in turn positions flapper element 100 relative to orifice 102 located at the end of pipe 104. Obviously fulcrum lever receives a force imparted by the temperature sensor at one end of the pivot and an additional force imparted by the fluid impinging on flapper element 100, discharging from pipe 104. The purpose of this arrangement is to eliminate the varying pressures that are normally attendant a servo system that utilizes engine bleed as supply pressure, thus pressure in pipe 104 is proportional only to temperature in duct 14.

From the foregoing it is apparent that fulcrumed lever 94 sees the forces imparted by the fluid discharging from orifice 102 and the force of spring 92 less the spring force of spring 96. This arrangement makes fulcrum lever 94 insensitive to varying supply pressure.

Stop 93 serves to prevent the temperature controller from producing a signal when the temperature sensed by temperature sensor 80 is below a predetermined value. Hence, it is obvious that in this mode, that is when spring retainer 90 abuts against stop 93 the temperature controller is rendered inoperative and the pressure in line 104 is held to a constant value resulting in operation with only the pressure regulator controlling, via diaphragm 44. Conversely, when diaphragm 44 abuts against screw 63 the pressure regulator is rendered inoperative and the temperature controller can be the sole controller.

The temperature controller servo works in a manner similar to the pressure regulator servo. Fulcrumed lever 94 carries at one end flapper 100 which moves relative to orifice 102 for varying the pressure drop across fixed restriction 106. This acting on the face of diaphragm 46. The force generated by diaphragm 46 is transmitted to fulcrumed lever 50 for controlling flapper 56 and hence actuator 18 for moving throttle valve 16. Hence, when temperature exceeds a predetermined value, notwithstanding the pressure, valve 16 is moved to a closed position to reduce the flow in the heat exchanger and prevent the temperature from exceeding a predetermined value.

Hence, this invention provides means for utilizing a pressure regulator and valve to serve the dual function of temperature limiting while assuring stable operation by virtue of the valve position feedback. Additionally the pressure error is minimized by providing stop means 93 assuring that the temperature signal is not interferring with the pressure regulator when the temperature is below a predetermined value. Additionally, temperature error is minimized by providing stop means 63 which allows for overriding the normal pressure signal. And further, the temperature sensor is rendered more accurate by making it insensitive to supply pressure fluctuations.

It should be understood that the invention is not limited to the particular embodiments shown and described herein, but that various changes and modifications may be made without departing from the spirit or scope of this novel concept as defined by the following claims.

I claim:

1. A pneumatic system in combination with a heat exchanger, said pneumatic system controlling the pressure and temperature of air discharging from the heat exchanger comprising valve means for controlling the pressure of air passing through said heat exchanger, an actuator, means responsive to the pressure of the heat exchanger air for controlling said actuator, means responsive to the temperature of the heat exchanger discharge air for further controlling said actuator, stop means cooperating with said temperature responsive means for rendering said temperature responsive means inoperative when said temperature of the heat exchanger discharge air is below a predetermined value, and additional stop means for rendering said pressure regulating means inoperative when the temperature is above a predetermined value.

2. A pneumatic system as claimed in claim 1 wherein said temperature responsive means includes servo means including a flapper valve attached to one end of a fulcrumed lever receiving servo supply pressure and spring means attached to the other end of said lever, and means responsive to the temperature of the air downstream of said heat exchanger for changing the height of said spring means so as to make said servo means insensible to pressure fluctuation in said servo supply pressure.

3. A pneumatic system as claimed in claim 1 wherein said valve means is disposed downstream of said heat exchanger.

4. A pneumatic system in combination with a heat exchanger, means for controlling the pressure and temperature of the fluid discharging from the heat exchanger comprising a duct for receiving the heat exchanger discharge fluid, a valve in said duct, actuator means for controlling the position of said valve, a pressure sensor responding to the pressure of the fluid in said duct, control means for controlling said actuator means for effectuating movement of said valve to control the pressure in said duct, a temperature sensor responsive to the temperature of the fluid in said duct, additional control means also controlling said actuator means, and stop means cooperating with said additional control means for rendering said temperature responsive means inoperative when the temperature of said fluid is below a predetermined value.

5. A pneumatic system as claimed in claim 4 wherein said control means includes a first flexible element having one face responding to the pressure of said fluid, and a second flexible means having one face responsive to the said additional control means and stop means cooperating with said first flexible element which renders said first control means inoperative when the temperature of said fluid goes beyond a predetermined value, whereby said second flexible element becomes the sole influence on said control means.